Feb. 16, 1965  E. L. HEINZ  3,169,324
SLIDE-TYPE, COURSE LEVELING ATTACHMENT FOR MASON'S LEVEL
Filed Feb. 28, 1961

INVENTOR.
ELMER L. HEINZ
BY M. Ralph Shaffer
HIS ATTORNEY

United States Patent Office 3,169,324
Patented Feb. 16, 1965

3,169,324
SLIDE-TYPE, COURSE LEVELING ATTACHMENT FOR MASON'S LEVEL
Elmer L. Heinz, 1155 South 150 West, Orem, Utah
Filed Feb. 28, 1961, Ser. No. 92,377
4 Claims. (Cl. 33—206)

The present invention relates to level gauges, hereinafter referred to simply as "levels," for use by brick or stone masons and, more particularly, to a new and improved level device, and attachment for a conventional level, which will enable the artisan to lay uniform, level courses or runs of brick, block, and so forth in such a manner as to insure equal and uniform mortar layers.

To understand the invention in its general context and the contribution thereof to the art of masonry, some knowledge of masonry construction in general is required. For example, in order to construct a brick or cement or cinderblock wall of any appreciable length the artisan will first pour or have poured the suitable cement footing or base which is completely level. Upon this base and at both ends thereof the artisan will construct respective "leads," that is, rising corner areas of superimposed runs of masonry which are angulated outwardly to the upper corners thereof which form, perhaps, single brick tops or caps. After suitable leads are constructed, implements will be provided for routing wires or strings from the upper level of one course or run from one lead to the upper level of the corresponding course of the remaining lead. The artisan then finds it very easy, in insuring level courses and uniform mortar thickness, to "fill in" between corresponding runs of the two leads and by tapping down each brick or block appropriately as it is laid so that the upper surface thereof comes in line with the placed string.

It will be noted at this juncture that the uniformity of the wall to be constructed hinges upon the accurate construction of the corner leads of the wall.

In the past certain types of brick mason's levels have been equipped with permanently secured fingers which may be elongated and retained in place as desired so that, when the level is disposed upon the particular course of brick being run, the finger will overlap this course and come in contact with the course previously run. Such mason's levels of which the inventor is aware have these permanently secured fingers of the levels permanently affixed at one of the ends thereof. This is perfectly satisfactory for running the lower courses of brick of the corner leads. When, however, the upper areas of the triangularly configured courses are approached, levels with end secured fingers are quite unsatisfactory, and accuracy is lost, since the artisan must supply a countertorque by his free hand in order to balance the level to horizontal position. If the level were resting so that its center of gravity would pass through the upper brick or bricks being layed at the upper part of the lead, no problem would exist. This the inventor has provided for by designing a slideable attachment for conventional levels (which may also be supplied as an integral related part with a suitable level for sale and distribution), which attachment is made slideable along the level so that the same may be disposed at the end of the level for long courses or runs, and wherein the attachment may be centrally disposed on the level when needed at the upper areas of the corner leads.

Accordingly, an object of the present invention is to provide a new and useful attachment for mason's levels, and combined level and slide attachment therefor, which will insure uniformity of mortar thickness not only for long courses or runs but also for short ones.

A further object of the invention is to supply a novel mason's level tool or device which will be suitable for the erection of the corner leads of a masonry wall, for example, the tool being such that the depth in finger thereof may be disposed at the end of the level for lower lead runs and centrally thereof for upper lead runs.

According to the present invention the brick or stone mason's level is supplied with a course leveling attachment in the form of a slide, releasably securable to the level bar of the tool at a particular chosen place, which slide is provided with a transversely extensible elongate member or finger. This member, together with its retaining means, may be so designed that one may readily perceive the dimension which the member extends from the level being used. Suitable means are supplied the device so that it may have its elongate member or finger disposed at the end thereof for gauging long courses, whereas the finger may be disposed medially of the level for one or two-brick courses at the top of a constructed end lead, for example.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
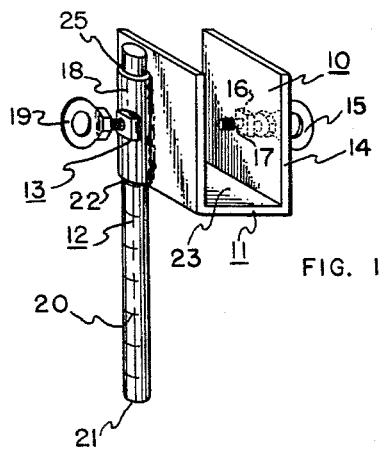
FIGURE 1 is a perspective view of a course leveling attachment for a mason's level according to the present invention.

In FIGURE 1 the course leveling attachment 10 of the invention is shown to include a slide member 11, an elongate member 12, and means 13 for releasably securing the elongate member 12 to slide member 11. As shown, the slide member 11 may comprise a U-configured bracket 14 having a thumb screw 15 threaded through nut-configured boss 16 and bracket aperture 17. Of course, it will be understood that various configurations of slide member 11 may be employed; thus, the same may comprise a rectangularly configured slide which is completely closed. Other configurations are possible. Additionally, various means may be used in lieu of thumb screw 15 for releasably securing the slide member 11 to the level to be incorporated therewith. Furthermore, rather than use a boss 16, the thumb screw 15 may simply be threaded solely through threaded aperture 17 of bracket 14.

In the same vein the means 13 for releasably securing elongate member 12, while shown to comprise a sleeve 18 welded or otherwise affixed to slide member 11 and including a thumb screw 19 threaded through sleeve 18 to engage elongate member 12, may of course take other forms. Thus, were elongate member 12 to take the form of an indexed slotted plate, for example, the securing means 13 might simply comprise the thumb screw 19 alone, being threaded directly into slide member 11 proper.

In turning our consideration to elongate member 12 itself, it will be seen that the same includes a plurality of markings 20 and, of course, a brick contact end 21.

It will be noted throughout the drawings that extremity 22 of the means 13 is disposed in the same horizontal plane as the upwardly facing surface 23 of slide member 11. It will be noted that the lower surface 24 of the mason's level (see momentarily FIGURE 2) will be disposed in contact engagement with the upwardly facing surface 23 in FIGURE 1. With extremity 22 being in the same horizontal plane as surface 23 then extremity 22 may serve as an index, cooperating with markings 20 of elongate member 12 so as to indicate the distance of transverse extension of elongate member 12 with respect to the lower surface 24 of the level being used.

Conceivably the means 13 employed may be otherwise secured to slide member 11 so that, perhaps, even the upper extremity 25 of means 13 might be employed as an index with markings 20.

Figure 2:
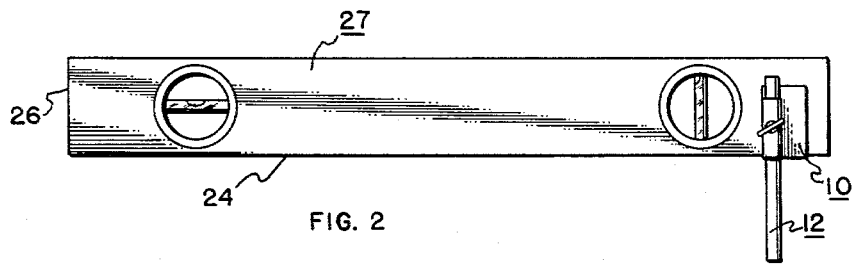
FIGURE 2 is an elevation illustrating the complete, brick mason's level device which concludes a conventional level plus the attachment illustrated in FIGURE 1.

FIGURE 2 illustrates an elevation of the completed level device for use by masonry workmen. It is deemed desirable to fabricate the attachment 10 in a manner so that the elongate member 12 thereof is off-center with respect thereto. This is particularly useful where the attachment 10 is translated all the way to the left in FIGURE 2 so that elongate member 12 is disposed closely adjacent to the end 26 of level 27. When this is the case then, even in the absence of markings disposed upon elongate member 12, a very accurate measurement may be made of the extension of elongate member 12 relative to the lower surface 24 of level 27 at end 26 thereof.

Figure 3:
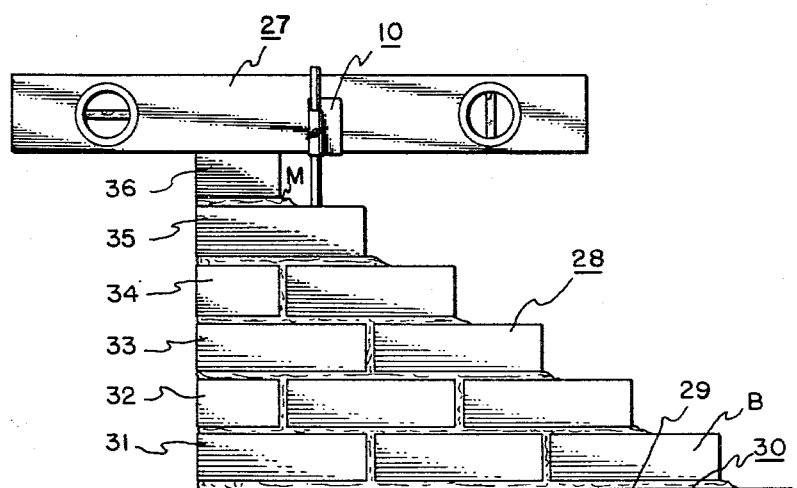
FIGURE 3 is an elevation of the level device of the invention and indicates usage thereof in completing the erection of a masonry corner lead.

FIGURE 3 illustrates the manner of use of the device of the present invention in erecting a masonry lead 28. Disposed upon the upper surface 29 of a concrete base or footing 30 are a plurality of courses 31–36. The longest course is of course the bottom one (31) so that for at least two of the three bricks or blocks B shown the level will be used with the attachment 10 disposed at either one end or the other of level 27 as illustrated in FIGURE 2.

The above will also hold true for the next three courses or runs 32, 33 and 34. When, however, the upper courses 35 and 36 are laid (and particularly with respect to the latter) the slideable attachment 10 must of necessity be translated toward the middle of the level as shown in FIGURE 3. This is because of the fact that, were the attachments 10 still disposed on the end of a level, it would be extremely difficult to obtain a level mortar layer at M since, as is well known, a level is much more difficult to plumb when the contact is at or near the edge thereof than where level-block contact is disposed near the middle of a level. Accordingly, no torques are required to be applied by hand to the level for "leveling" the same when the attachment 10 is positioned near the middle of the level so as to enable the level per se to be balanced without external hand pressure. Thus, there is seen the essential reason of having the attachment 10 slideable with respect to level 27.

The device of the invention should be used for the erection of both right and left "leads." Thereafter, the courses will be completed by the mason running a string or wire between the upper surfaces of each lead (one being shown in FIGURE 3) and the bricks or blocks being tapped in place in the usual manner.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A mason's level device including, in combination, a level, a slide member slideably disposed upon said level and having means for releasably securing said slide member to said level at a selected disposition with respect thereto, an elongate member transversely disposed with respect to said level, and means securing said elongate member to said slide member for enabling a selected, releasably fixed extension of said elongate member away from said level and in a direction which is transverse with respect to said level, said elongate member being in off-set relationship with respect to said level such that the travel of the former is unimpeded by the presence of the latter and said slide member, and wherein said level has a lower surface, said slide member being U-configured and having an interior, upwardly facing surface disposed in contact with said lower surface of said level, said securing means including tubular means slideably encompassing said elongate member and having an extremity disposed in the same horizontal plane as said interior, upwardly facing surface of said slide member and screw means for fixing the position of said elongate member without said tubular means.

2. The device of claim 1 wherein said elongate member has a contact end and is provided with markings to indicate the measure of extension of said contact end from said extremity of said slideably engaging means, said slideably engaging means providing in said extremity an index therefor.

3. As a course leveling attachment for a mason's level, a slide member adapted for slideable disposition upon said level and having means for enabling the releasable securement of said slide member thereto at a selected disposition with respect thereto, a transverse, elongate member, and means securing said transverse, elongate member to said slide member for enabling a selected, releasably fixed extension of said elongate member away from said level and in a direction which is transverse with respect to said level, said transverse member being off-set with respect to said slide member at that portion of the latter adapted to tightly receive said level, said transverse member being unimpeded in the travel by said slide member, and wherein said level has a lower surface, said slide member being U-configured and having an interior, upwardly facing surface adapted for contact with said lower surface of said level, said securing means including a tubular means slideably engaging said elongate member and having an extremity disposed in the same horizontal plane as said interior, upwardly facing surface of said slide member and screw means for fixing the portion of said elongate member with said tubular means.

4. The attachment of claim 3 wherein said elongate member has a contact end and is provided with markings to indicate the measure of extension of said contact end from said extremity of said slideably engaging means, said slideably engaging means providing in said extension an index therefor.

References Cited in the file of this patent

UNITED STATES PATENTS

| | | |
|---|---|---|
| 527,815 | Schnell | Oct. 23, 1894 |
| 2,746,164 | Eitzen | May 22, 1956 |